United States Patent
Ziech et al.

(12) 
(10) Patent No.: US 6,398,262 B1
(45) Date of Patent: Jun. 4, 2002

(54) MODULAR SUBFRAME ASSEMBLY FOR A MOTOR VEHICLE

(75) Inventors: James F. Ziech, Kalamazoo, MI (US); Paul Robert Pollock, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/669,631

(22) Filed: Sep. 26, 2000

(51) Int. Cl.[7] ............................................. B62D 21/11
(52) U.S. Cl. ................ 280/785; 280/788; 280/124.109; 180/311
(58) Field of Search .............................. 280/785, 788, 280/124.109; 180/311, 312

(56) References Cited

U.S. PATENT DOCUMENTS

| | | | |
|---|---|---|---|
| 2,888,269 A | | 5/1956 | Hogsten |
| 3,243,007 A | | 3/1966 | Berckhan |
| 3,441,289 A | * | 4/1969 | Frantz et al. |
| 4,057,121 A | | 11/1977 | Stedman |
| 4,240,517 A | * | 12/1980 | Harlow et al. |
| 4,422,666 A | * | 12/1983 | Proctor |
| 4,813,704 A | * | 3/1989 | Smith |
| 5,538,274 A | | 7/1996 | Schmitz |
| 5,833,026 A | * | 11/1998 | Zetterstrom et al. |
| 5,918,893 A | | 7/1999 | Marquardt et al. |
| 5,997,038 A | * | 12/1999 | Dostert et al. |
| 6,269,902 B1 | * | 8/2001 | Miyagawa |

FOREIGN PATENT DOCUMENTS

| | | |
|---|---|---|
| DE | 41 35 361 A1 | 4/1993 |
| DE | 298 00 368 U1 | 7/1998 |
| DE | 199 22 800 A1 | 11/1999 |
| EP | 0 530 594 A1 | 3/1993 |
| EP | 0 653 344 A1 | 5/1995 |
| FR | 2 650 223 A | 2/1991 |
| WO | WO 99/30956 | 6/1999 |

* cited by examiner

*Primary Examiner*—Paul N. Dickson
(74) *Attorney, Agent, or Firm*—Liniak, Berenato, Longacre & White

(57) ABSTRACT

A modular sub-frame comprises an upper portion, a lower portion and an intermediate shock absorbing member. The upper portion is a steel fabrication for mounting to the chassis and the lower portion is a light-weight metal, e.g., aluminum, casting or castings for mounting to the steering components, whereby these two portions are separated by a vibration-dampening bushing. The lower portion of the modular sub-frame may be formed as a one-piece cast member or a multi-piece casting design where the casting members are jointed by bolts or other fastening means. In the multi-piece casting design, the front and rear bulkhead castings are the same identical part as are the top longitudinal members to provide interchangeability among the various components. By splitting the sub-frame into two parts, the top part can be isolated from the bottom part to reduce noise transmission from the sub-frame to the chassis, while maintaining the necessary rigid positioning of the suspension control arms and steering system. Also, the top part of the sub-frame can be readily revised to adapt to various chassis configurations without having to revise the bottom part of the sub-frame. With this invention, the lower half of the sub-frame can be highly tooled for low cost and improved dimensional reliability. The upper half of the sub-frame can be tooled with a lower volume manufacturing process to save on capital investment. The design of this invention adds flexibility for various chassis configurations while maintaining a constant suspension mounting framework.

13 Claims, 8 Drawing Sheets

MODULAR SUBFRAME ASSEMBLY FOR A MOTOR VEHICLE

BACKGROUND OF THE INVENTION

1. Field of the Invention

The invention relates to a sub-frame for a motor vehicle and, more particularly, to a modular sub-frame for a heavy-duty axle mounting wherein a bottom center casting may be changed to adapt the sub-frame to various steering systems.

2. Description of Related Art

When installing an independent front suspension axle into a heavy duty vehicle with a "C" channel or space frame type chassis, a sub-frame is usually required to adapt the independent front suspension axle to the chassis. The sub-frame has the advantage that it forms a complete axle module framework, but it must be revised to fit each chassis configuration.

Conventional sub-frame assemblies are designed to adapt independent front suspensions to a specific chassis design using welded steel plates and tubes. This conventional design tends to be unduly heavy and problems are encountered due to welding distortions. Moreover, there is limited flexibility to adapt these conventional sub-frame designs to various steering systems and chassis configurations.

Moreover, even though the independent front suspension axle can incorporate rubber control arm pivot points and can use an air bag type spring, road noise and vibration are transmitted from the independent front suspension to the chassis.

The need exists for a versatile sub-frame design that can be readily adapted to different chassis configurations and that reduces the amount of noise and vibration transmitted to the chassis.

SUMMARY OF THE INVENTION

The present invention is a modular sub-frame design formed as an upper portion for mounting to the chassis and a lower portion using light-weight metal, e.g., aluminum, casting or castings for mounting to the steering components, whereby these two portions are separated by a vibration-dampening bushing. The lower portion supports the steering system and is adaptable to standard automotive bell crank/idler linkages, integral steering gear/idler linkages, and rack-and-pinion steering systems.

In a first preferred design, the lower portion of the modular sub-frame is a one-piece cast member isolated from the upper portion and the chassis by a rubber mounting bushing.

In a second preferred design, the lower portion is a multi-piece casting design where the casting members are jointed by bolts or other fastening means. In the multi-piece casting design, the front and rear bulkhead castings are the same identical part as are the top longitudinal members to provide interchangeability among the various components.

With this design, the lower half of the sub-frame can be highly tooled for low cost and improved dimensional reliability. The upper half of the sub-frame can be tooled with a lower volume manufacturing process to save on capital investment.

The design of this invention adds flexibility for various chassis configurations while maintaining a constant suspension mounting framework.

The invention also provides for a lower bolted plate that can be removed for engine service. A separate bracket can be used to mount the upper control arm to the lower sub-frame so that caster angle and percent anti-dive can be changed to suit specific chassis requirements.

By splitting the sub-frame into two parts, the top part can be isolated from the bottom part to reduce noise transmission from the sub-frame to the chassis, while maintaining the necessary rigid positioning of the suspension control arms and steering system. Also, the top part of the sub-frame can be readily revised to adapt to various chassis configurations without having to revise the bottom part of the sub-frame.

These and other benefits provide by the instant invention will be apparent from the following description and associated drawings.

DETAILED DESCRIPTION OF PREFERRED EMBODIMENTS

Figure 1:
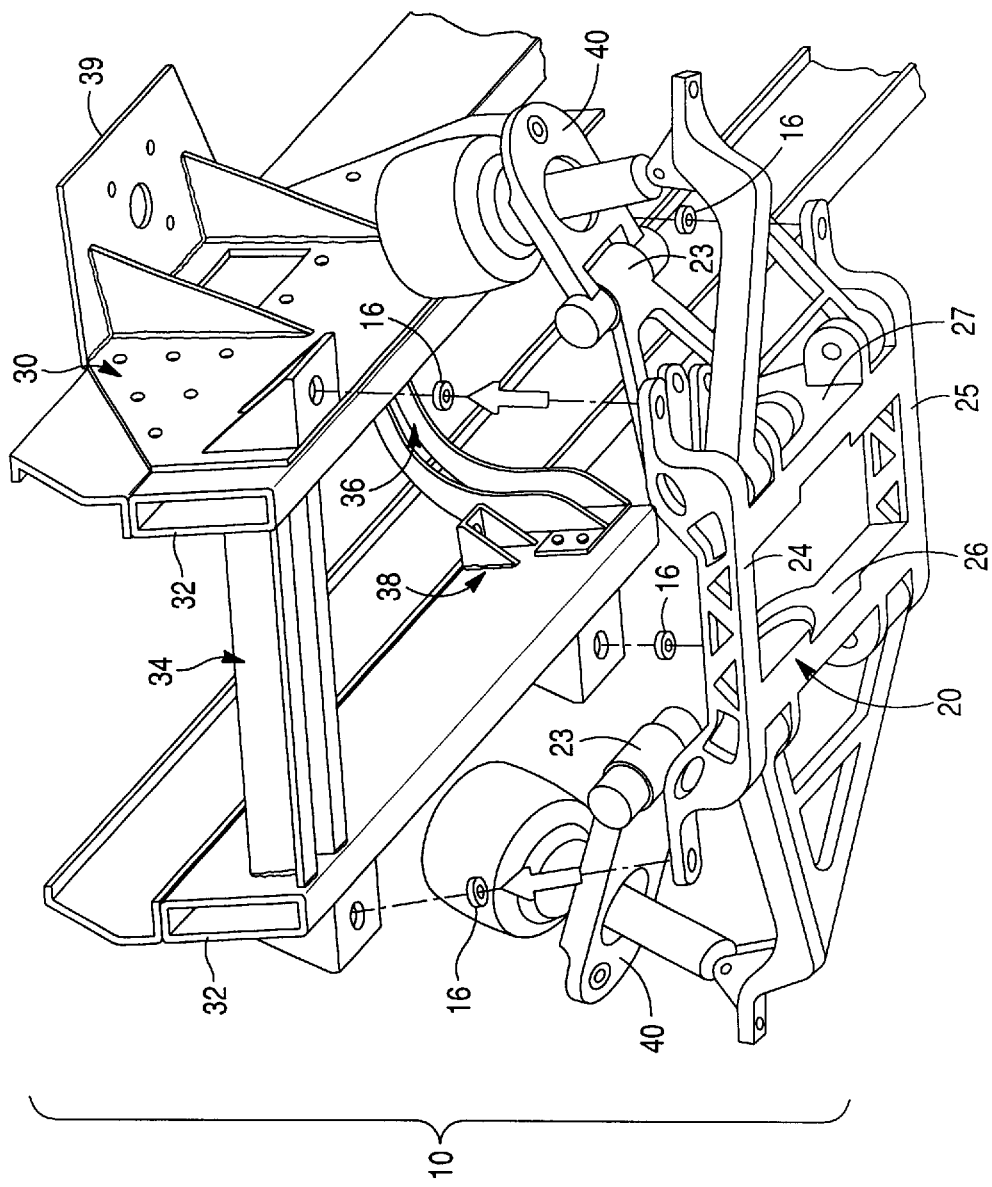
FIG. 1 is a bottom perspective schematic view showing the modular sub-frame assembly according to a first preferred embodiment.

With reference to FIG. 1, the first embodiment of the instant invention will now be described. The modular sub-frame assembly 10 of the invention includes a modular one-piece cast aluminum sub-frame lower portion 20, a steel fabricated chassis reinforcement upper portion 30, and vibration isolator bushings 16 interposed between the upper and lower portions 20, 30 of the sub-frame assembly 10.

In the embodiment illustrated in FIG. 1, the upper portion 30 is provided with a pair of aligned steel fabricated chassis reinforcement beams 32, a front engine mount cross member 34, rear engine mount cross member 36, and engine mount brackets 38 (only one shown). Suspension mounting brackets 39 are also provided on the upper portion 30.

The lower portion 20 is shown as a unitary cast aluminum body formed to mount the suspension system upper and lower arms. Alternately, a separate bracket 23 is used to mount the upper control arm 40 to the lower sub-frame 20 so that caster angle and percent anti-dive can be changed to suit specific chassis requirements. The lower portion 20 consists of front and rear bulkheads 24, 25 with longitudinal tubes or plates 26, 27 extending between the front and rear bulkheads.

Figure 2A:
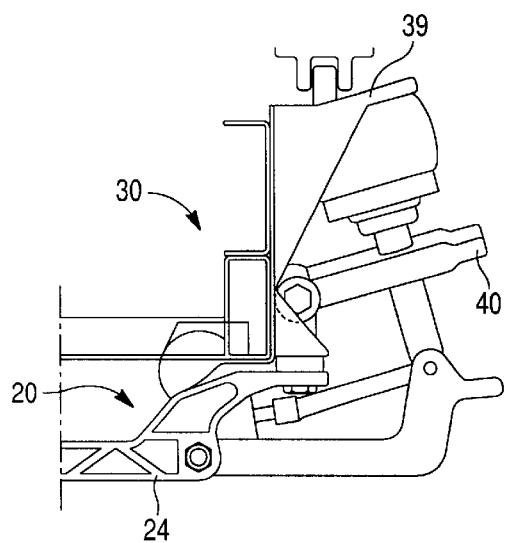
FIGS. 2A and 2B show partial cross-sectional views of two steering-mount arrangements for the first preferred embodiments.
Figure 2B:
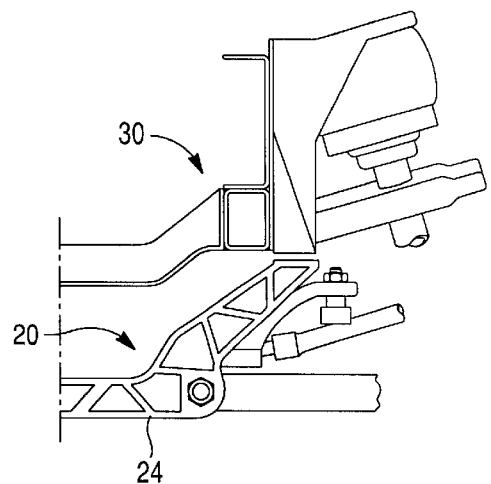

FIGS. 2A and 2B show partial cross-sectional views of two steering-mount arrangements for the first preferred embodiments, where the shape and disposition of the front and rear bulkheads 24, 25 is modified to suit the particular suspension and steering components for a particular vehicle chassis - the components for the suspension and steering systems being known in the art.

Figure 3A:
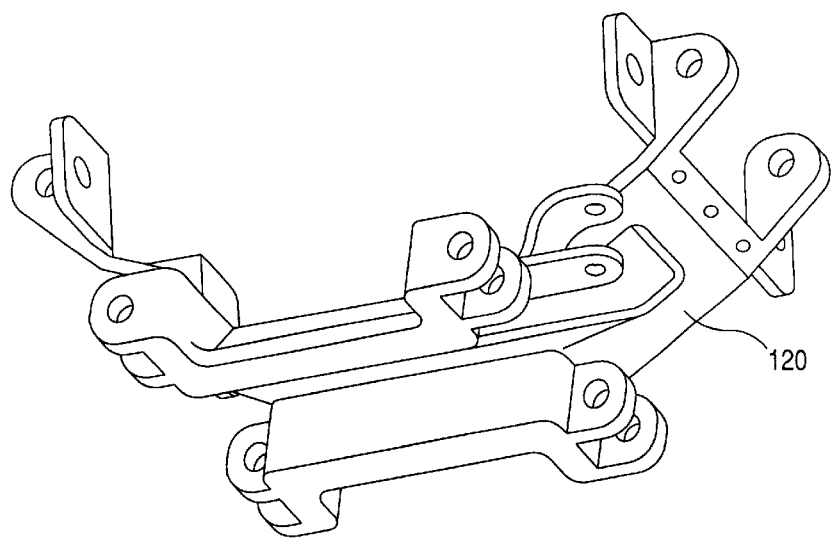
FIG. 3A is a bottom perspective view showing a one-piece lower sub-frame portion exemplifying one type of lower sub-frame portion shown in FIG. 3 formed to support the upper control arm, the lower control arm, and steering components.
Figure 3:
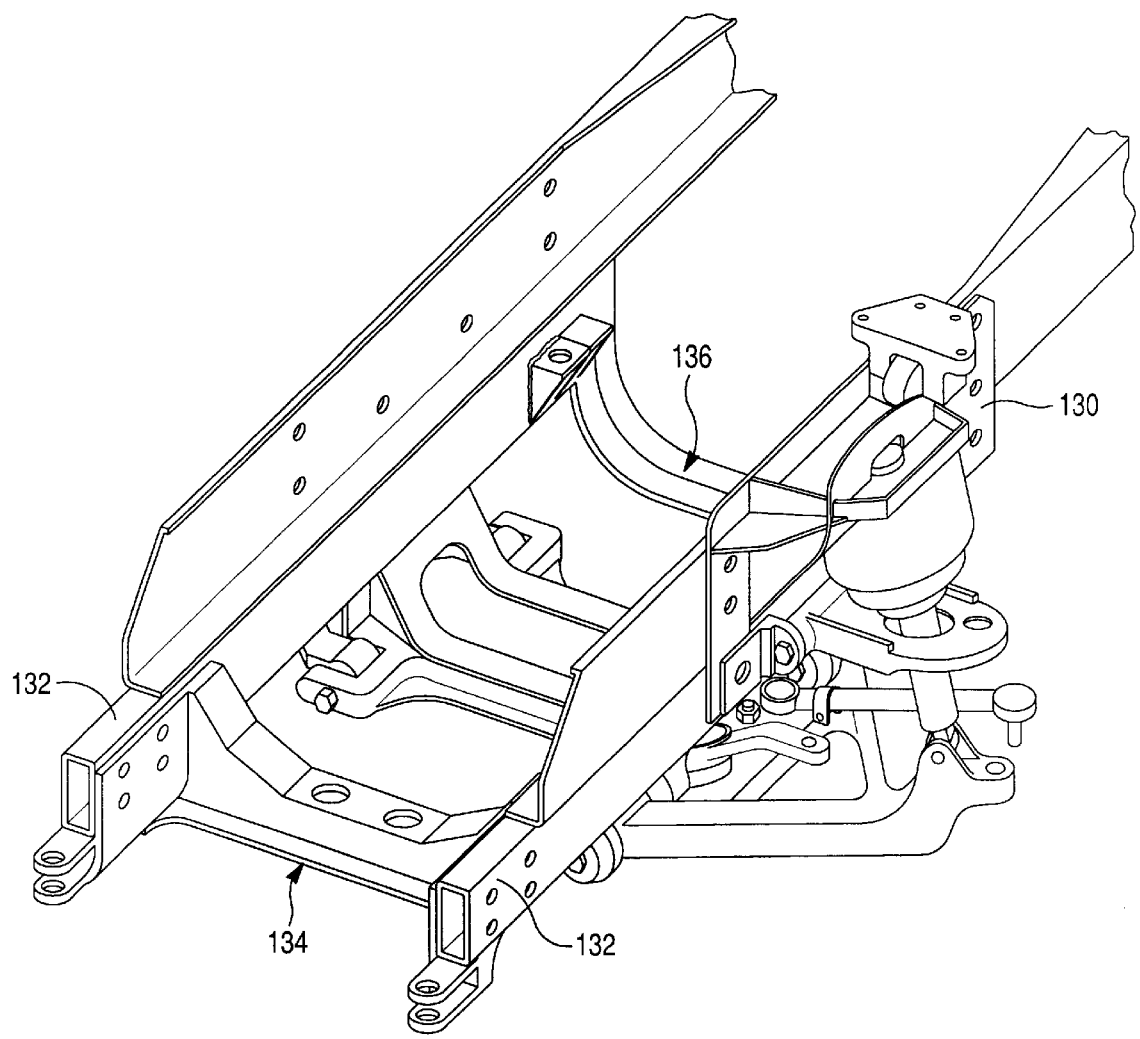
FIG. 3 is a top perspective view of a modified embodiment similar to the embodiment of FIG. 1.

FIG. 3 is a top perspective view of a modified embodiment of the sub-frame assembly similar to the embodiment of FIG. 1. In the embodiment of FIG. 3, the lower subframe 120 is of substantially narrower configuration and is provided with a different engine support and cross member layout. The front engine cross member 134 is formed as a cast aluminum engine mount affixed to the two aligned tubular steel frame rail reinforcement members 132, whereas the rear cross member 136 is fabricated steel welded or otherwise fastened to the aligned tubular steel frame reinforcement members 132.

FIG. 3A is a perspective view showing a one-piece lower sub-frame portion 120 exemplifying one type of lower sub-frame portion shown in FIG. 3 formed to support the upper control arm, the lower control arm, and steering components.

Figure 4:
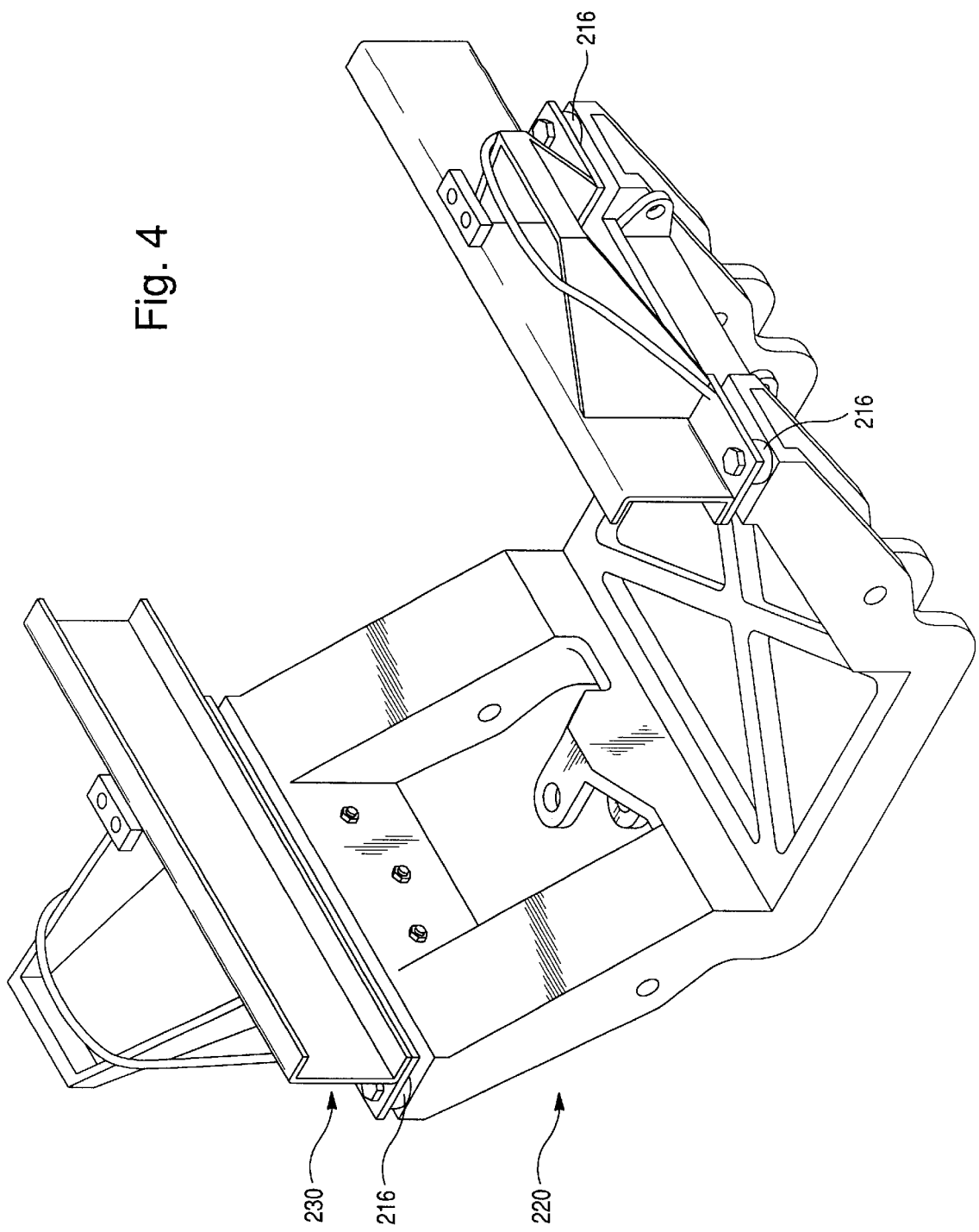
FIG. 4 is a perspective view of both the top portion, bottom portion and rubber isolator of the present invention with the lower portion formed as a unitary one-piece casting.

FIG. 4 is a perspective view of both the top portion, bottom portion and rubber isolator of the present invention with the lower portion formed as a unitary one-piece casting. In this simplified illustration, the primary components of the modular sub-frame assembly of this invention are shown to include the lower one-piece casting 220 separated from the fabricated steel upper portion 230 by the rubber isolators 216.

Figure 5:
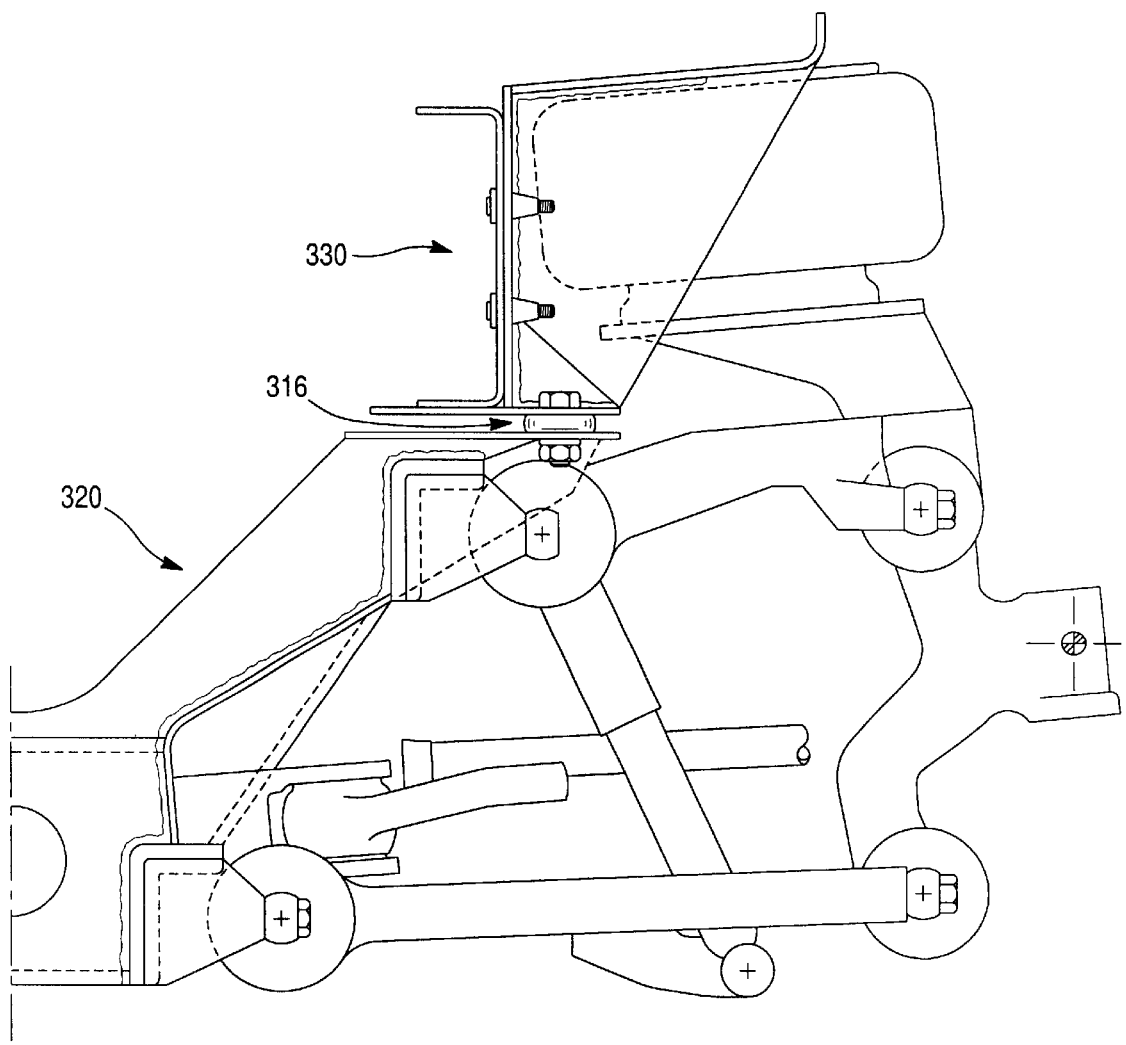
FIG. 5 is a cross sectional view showing the modular sub-frame assembly according to this invention.

FIG. 5 is a partial cross sectional view of the primary components of the modular sub-frame assembly with reference to the suspension components. FIG. 5 shows both the lower and upper control arms being mounted to the lower portion 320 of the sub-frame assembly as well as the vibration isolator bushing 316 interposed between the lower portion 320 and the upper portion 330 of the sub-frame assembly.

Figure 6:
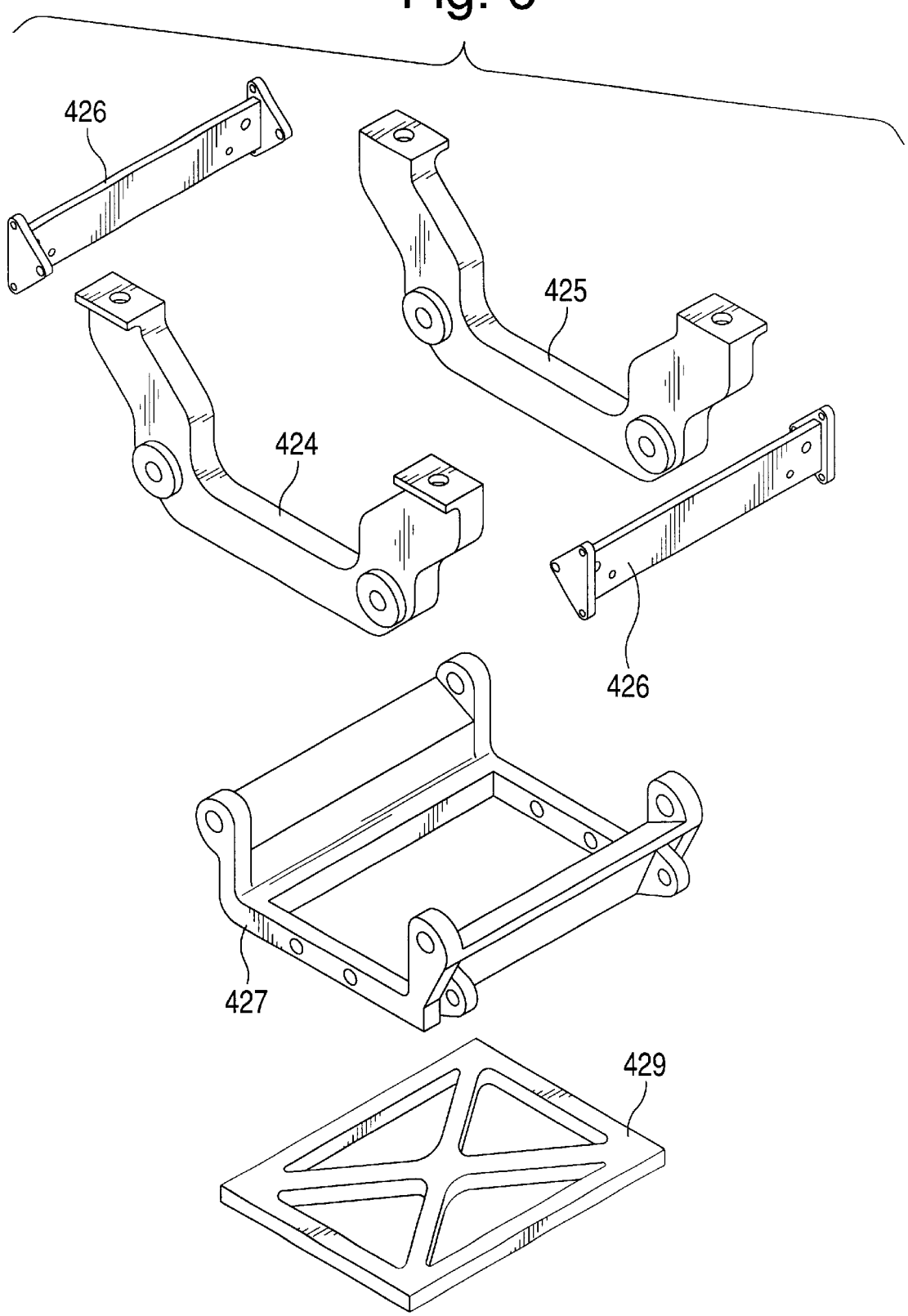
FIG. 6 is a perspective view schematically showing the multi-piece lower sub-frame portion according to the present invention.
Figure 7:
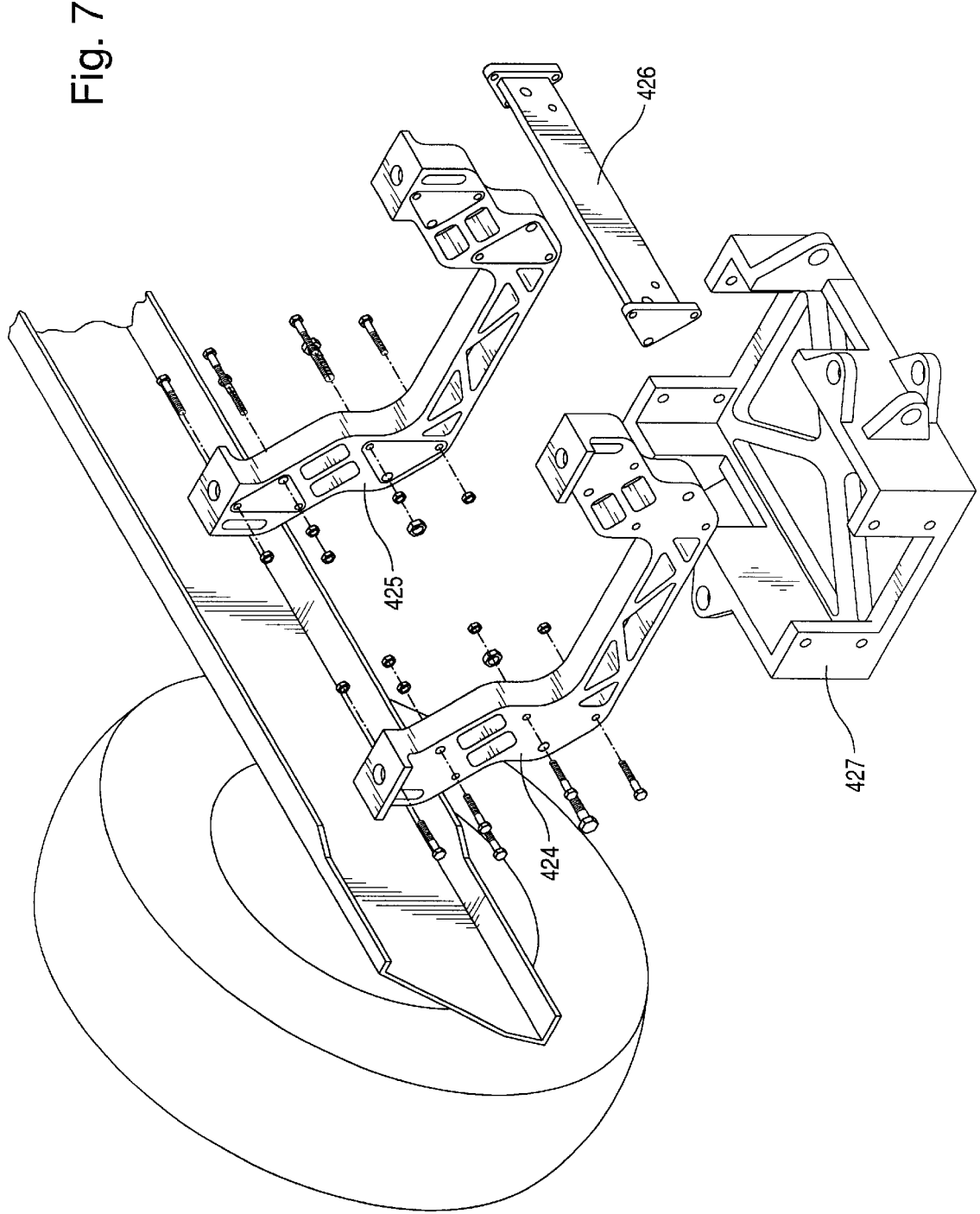
FIG. 7 is a perspective view schematically showing a variation of the multi-piece lower sub-frame portion shown in FIG. 6.

FIGS. 6 and 7 are exploded views showing the lower portion 420 of the sub-frame assembly whereby the lower portion 420 is designed as a multi-piece casting fastened together by bolts or other fastening means known to those of skill in the art (e.g., welding). Significant to the invention is the fact that the front bulkhead 424 and the rear bulkhead 425 are substantially identical in shape in order to provide interchangeability between these two components. Likewise, the longitudinal side plates 426 are identical; therefore, they are interchangeable one with respect to the other. Moreover, the embodiment of FIG. 6 provides a lower bolted plate 429 that can be removed from the central body 427 for engine service.

Figure 8:
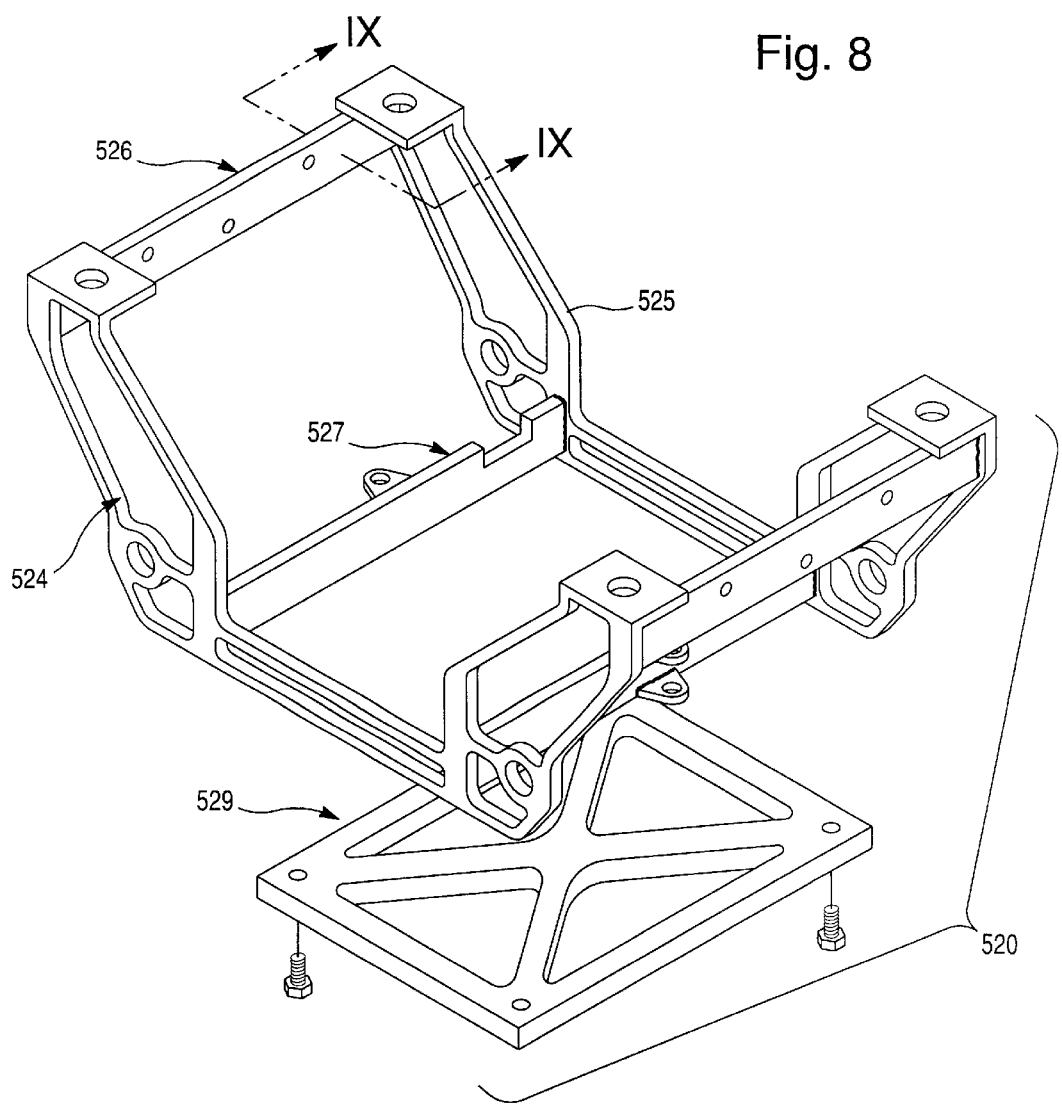
FIG. 8 is a perspective view schematically showing another variation of the lower sub-frame portion shown in FIG. 6.

FIG. 8 shows a modified arrangement of the lower portion 520 of the sub-frame assembly whereby the front and rear bulkheads 524, 525 are once again formed as identical, interchangeable components interconnected by four longitudinal tubes 526, 527. A removable bottom plate 529 is bolted onto the sub-frame and is removed when the engine needs servicing.

Figure 9A:
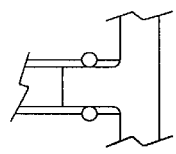
FIGS. 9A–9C show three different fastening arrangement for the various components of the multi-piece lower sub-frame assembly of this invention.
Figure 9B:
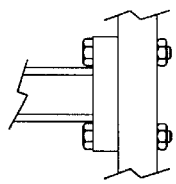
Figure 9C:
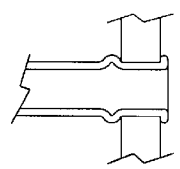

FIGS. 9A through 9C show three different ways to fasten the longitudinal tubes 526, 527 to the front and rear bulkheads 524, 525 as viewed along the section line IX—IX in FIG. 8. In FIG. 9A, the tube 526 is welded to the bulkhead 525 via a rivet or plug weld at a male and female joint as shown in the illustration. In FIG. 9B, a bolted joint is shown, and in FIG. 9C a swaged joint is shown whereby the tube 526 is passed through an aperture in the bulkhead 525 and reformed to provide the fixed connection.

From the foregoing description, it will be apparent to those of skill in the art that the present invention provides a modular sub-frame design formed as an upper portion mounted to a vehicle chassis and a lower portion using light-weight metal, e.g., aluminum, casting or castings mounted below the upper portion and to the steering components, whereby these two portions are separated by a vibration-dampening bushing. The lower portion supports the steering system and is adaptable to standard automotive bell crank/idler linkages, integral steering gear/idler linkages, and rack-and-pinion steering systems.

The lower portion of the modular sub-frame may be a one-piece cast member isolated from the upper portion and the chassis by a rubber mounting bushing. Alternately, the lower portion may be a multi-piece casting design where the casting members are jointed by bolts or other fastening means. In the multi-piece casting design, the front and rear bulkhead castings are the same identical part as are the top longitudinal members to provide interchangeability among the various components.

With this invention, the lower half of the sub-frame can be highly tooled for low cost and improved dimensional reliability. The upper half of the sub-frame can be tooled with a lower volume manufacturing process to save on capital investment.

The design of this invention adds flexibility for various chassis configurations while maintaining a constant suspension mounting framework. The invention also provides an optional lower bolted plate that can be removed for engine service. A separate bracket can be used to mount the upper control arm to the lower sub-frame so that caster angle and percent antidive can be changed to suit specific chassis requirements.

By splitting the sub-frame into two parts, the top part can be isolated from the bottom part to reduce noise transmission from the sub-frame to the chassis, while maintaining the necessary rigid positioning of the suspension control arms and steering system. Also, the top part of the sub-frame can be readily revised to adapt to various chassis configurations without having to revise the bottom part of the sub-frame.

While the foregoing inventions have been shown and described with reference to several preferred embodiments, it will be understood by those of skill in the art that various changes in form and detail may be made therein without departing from the spirit and scope of the instant invention. For example, the specific material used to form the upper portion 30, 130, 230, etc., the lower portion 20, 120, 220, etc. and the isolator 16, 116, 216, etc. may be varied to provide the specific characteristics needed for the particular chassis. In the preferred design, the upper portion is fabricated steel and the lower portion is case aluminum.

What is claimed is:

1. A modular sub-frame assembly for a motor vehicle, said sub-frame comprising:
   a lower sub-frame portion comprising cast metal members defining a front cast bulkhead, a rear cast bulkhead, and a plurality of tubes extending longitudinally between said front and rear cast bulkheads;
   an upper sub-frame portion comprising a pair of aligned chassis reinforcement beams mounted onto said lower sub-frame portion and suspension mounting brackets adapted to direct suspension spring loads to said upper sub-frame portion substantially isolated from said lower sub-frame portion; and a cushion member interposed between said upper and lower sub-frame portions for reducing an amount of vibration transmitted therebetween.

2. The sub-frame assembly according to claim 1, wherein said lower sub-frame portion is cast from aluminum.

3. The sub-frame assembly according to claim 1, wherein said upper sub-frame portion is fabricated from steel.

4. The sub-frame assembly according to claim 1, wherein said lower sub-frame portion comprises a bracket member for mounting an upper control arm of a suspension system to said lower sub-frame portion in order that caster, camber and anti-dive can be modified.

5. The sub-frame assembly according to claim 1, wherein said lower sub-frame portion is cast as a one-piece unitary body including said front cast bulkhead, said rear cast bulkhead, and said plurality of tubes.

6. The sub-frame assembly according to claim 1, wherein said front cast bulkhead, said rear cast bulkhead, and said plurality of tubes are fastened together.

7. The sub-frame assembly according to claim 6, wherein said front and rear cast bulkheads are formed with a substantially identical configuration such that said front and rear bulkheads are interchangeable.

8. The sub-frame assembly according to claim 6, wherein said plurality of tubes includes components designed to be interchangeable.

9. A method of reducing noise and vibration transmitted from suspension and/or steering components to a chassis of a heavy-duty vehicle, said method comprising the steps of:

providing a lower sub-frame portion comprising cast metal members defining a front cast bulkhead, a rear cast bulkhead, and a plurality of tubes extending longitudinally between said front and rear cast bulkheads;

affixing said lower sub-frame portion to an upper control arm and a lower control arm of a suspension system;

providing an upper sub-frame portion comprising a pair of aligned chassis reinforcement beams adapted to be mounted to a chassis of a heavy-duty vehicle and suspension mounting brackets adapted to direct suspension spring loads to said upper sub-frame portion substantially isolated from said lower sub-frame portion;

affixing suspension springs to said suspension mounting brackets provided on said upper sub-frame portion; and providing a cushion member interposed between said upper and lower sub-frame portions for reducing an amount of vibration transmitted therebetween.

10. The method according to claim 9, further comprising the step of casting said lower sub-frame portion from aluminum.

11. The method according to claim 9, further comprising the step of fabricating said upper sub-frame portion from steel.

12. The method according to claim 9, further comprising the step of casting said lower sub-frame portion as a one-piece unitary body including said front cast bulkhead, said rear cast bulkhead, and said plurality of tubes.

13. The method according to claim 9, further comprising the step of forming said front and rear cast bulkheads with a substantially identical configuration such that said front and rear bulkheads are interchangeable.

* * * * *